Figure 1:
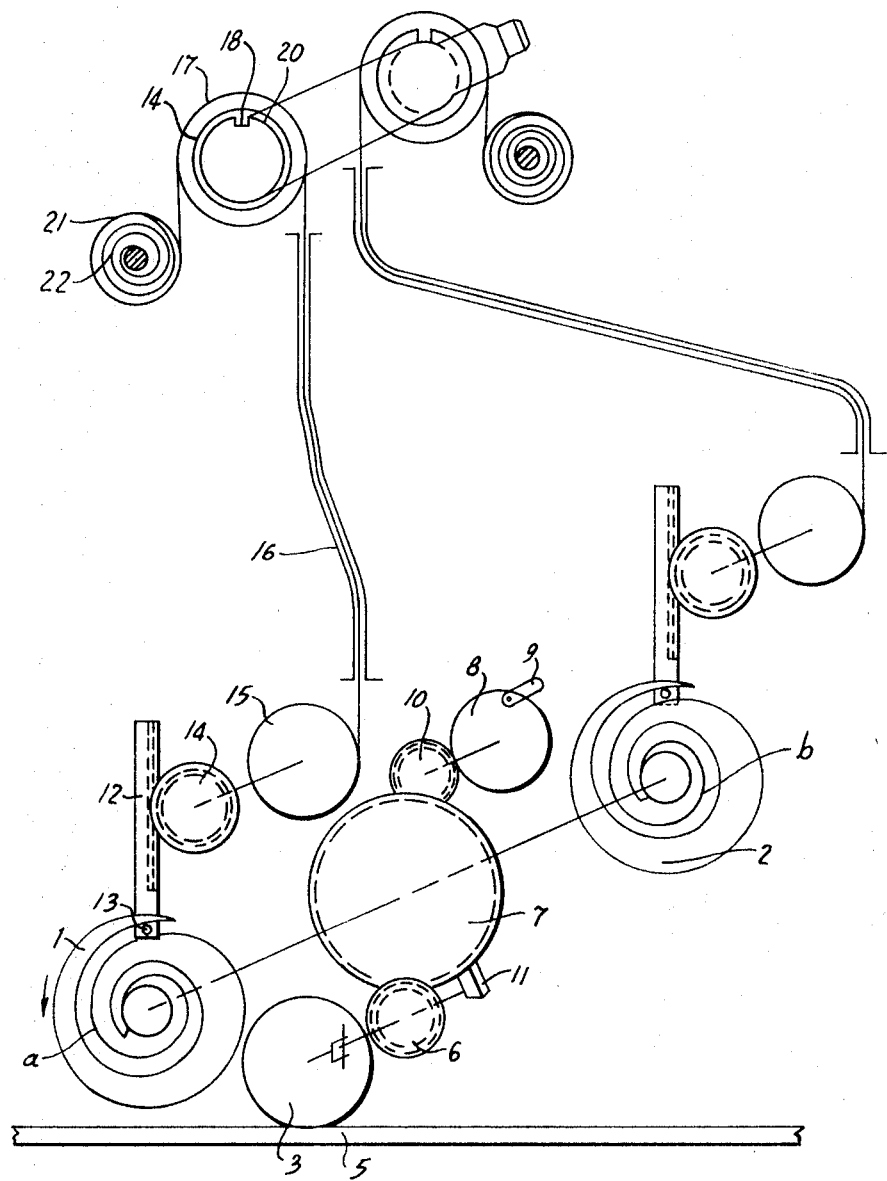

United States Patent

[11] 3,597,065

| [72] | Inventor | Toma Radulet<br>Bucharest, Romania |
|---|---|---|
| [21] | Appl. No. | 710,830 |
| [22] | Filed | Mar. 6, 1968 |
| [45] | Patented | Aug. 3, 1971 |
| [73] | Assignee | Comitetul De Stat Pentru Cultura St Arta<br>Bucharest, Romania |
| [32] | Priority | Mar. 11, 1967 |
| [33] | | Romania |
| [31] | | 53,291 |

[54] DEVICE FOR THE AUTOMATIC CONTROL OF AN OBJECTIVE LENS SYSTEM HAVING VARIABLE FOCAL LENGTH
12 Claims, 10 Drawing Figs.

| [52] | U.S. Cl. | 352/140, 95/45 |
| [51] | Int. Cl. | G03b 3/00 |
| [50] | Field of Search | 352/140; 95/45 |

[56] References Cited
UNITED STATES PATENTS

| 2,208,403 | 7/1940 | Winchester | 352/140 |
| 3,314,350 | 4/1967 | Husum | 95/45 |

FOREIGN PATENTS

| 659,998 | 5/1938 | Germany | 352/140 |

Primary Examiner—Samuel S. Matthews
Assistant Examiner—Monroe H. Hayes
Attorney—Arthur O. Klein ABSTRACT: A device for automatically controlling and adjusting the focusing mechanism and the mechanism for varying the focal length of an objective lens system of a movie camera mounted on dolly. The device of the invention includes a pair of spiral cams which are operatively connected to one or more wheels of the dolly to the focusing mechanism and the means mechanism for varying the focal length of the objective lens system respectively.

PATENTED AUG 3 1971
3,597,065
SHEET 2 OF 4
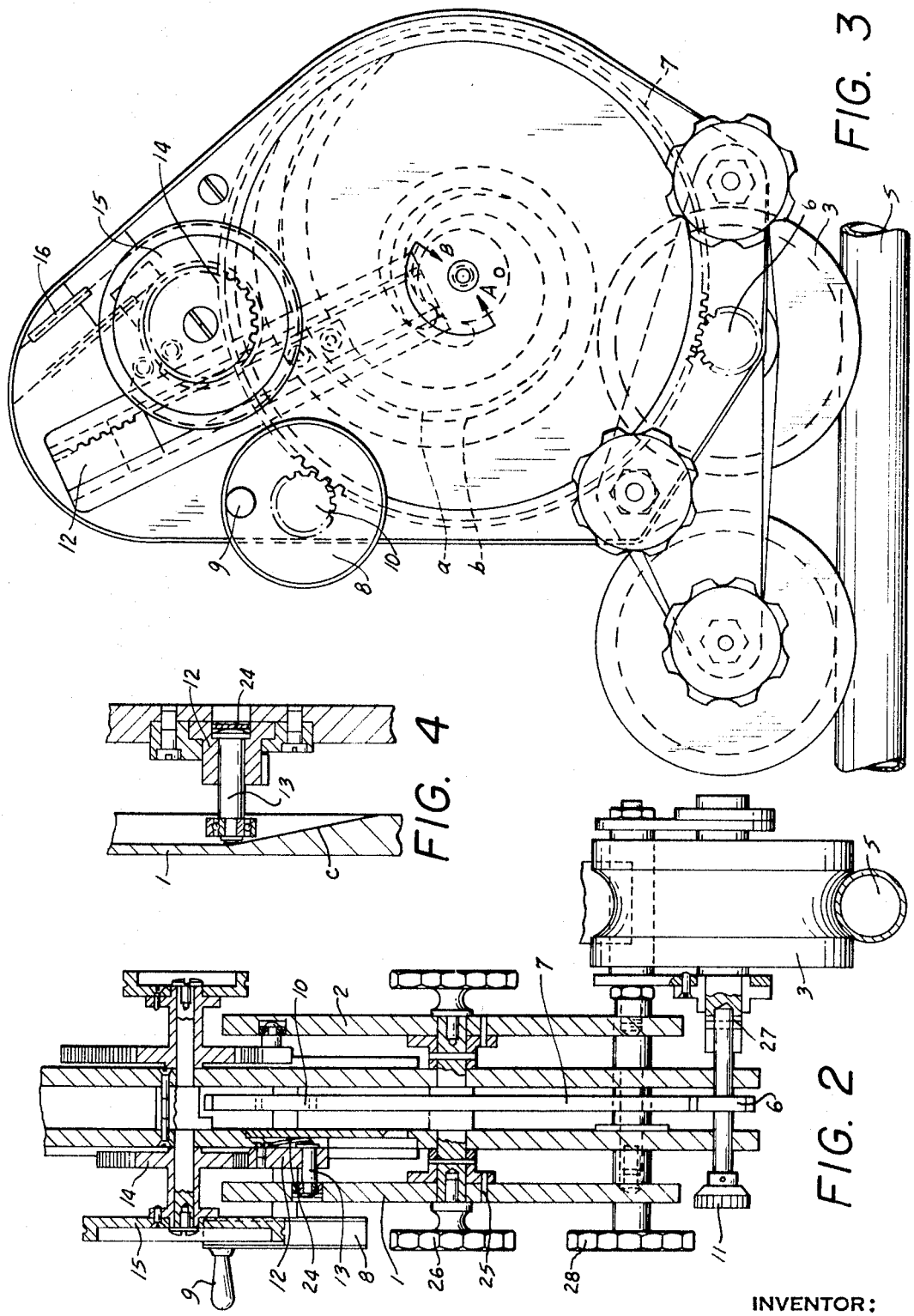
INVENTOR:
Toma Radulet
BY: Arthur O. Klein
ATTORNEY

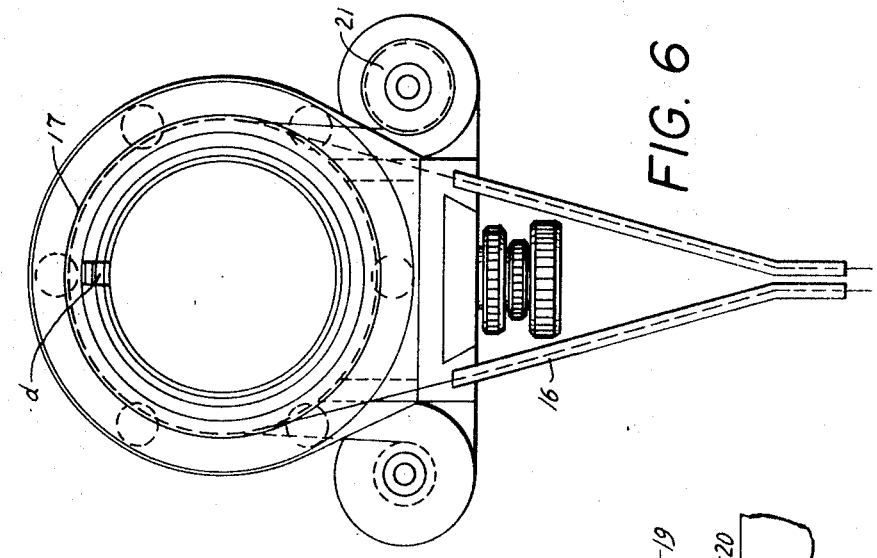
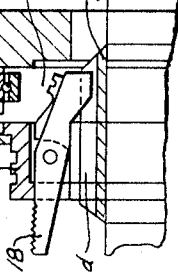
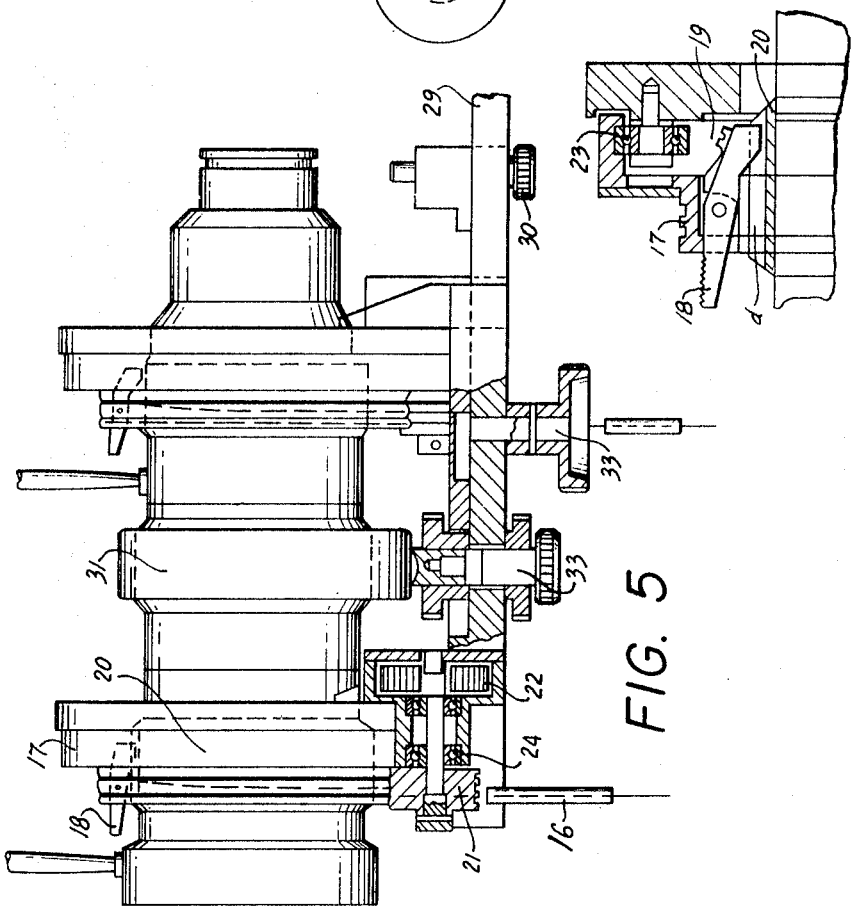

INVENTOR:
Toma Radulet

BY: Arthur O. Klein
ATTORNEY

DEVICE FOR THE AUTOMATIC CONTROL OF AN OBJECTIVE LENS SYSTEM HAVING VARIABLE FOCAL LENGTH

An object of the present invention is to provide a device ensuring the automatic control of the variation of the focal length and of the focusing of the image clearness when shooting with objective lens systems having variable focal length. This automatic control is correlated as a function of the traveling of the dolly on which the camera is mounted, or as a function of a corresponding manual control, thereby realizing shootings having special effects as for example, a shooting of fixed frames with variable perspective, a shooting with automatic continuous variation of focal length, a shooting with automatic focusing of the image clearness and many special cinematographic other effects.

It is known, that when shooting a fixed frame with a variable perspective, for obtaining the special cinematographic effect of a continuous variation of the size of the objects situated in front and behind the principal subject of the shooting, which is being permanently contained in the same frame, it is necessary in order to cancel out the continuous variation of the frame of the principal subject, which would be ordinarily caused by the continuous variation of the distance between the object and the camera, to continuously correspondingly vary of the objective's focal length.

To this end it is necessary to effect a precise correlation between the variation of the distance from the principal subject to the camera and the corresponding variation of the focal length. This correlation can only be obtained by means of a special device, which can be manually controlled or by the traveling of the dolly itself.

There is also known in the art the working principles of a device for the automatic control of objectives with variable focal length. This known device, which is described in U.S. Pat. No. 3,314,350, can be used only for the shooting of fixed frames with variable perspective. This known device utilizes as control elements for the regulation of the image clearness and for the variation of the focal length, two cams with corresponding profiles, which extend along the entire length of the traveling rail, correspond to the compensation possibilities of the zoom lens; this known device utilizes also as transmission elements two pinion-rack-gears transmitting the motions to the objective through two closed circuit Bowden-cables (flexible shafts).

This known system lacks precision and also is not sufficiently convenient, because at the length of the rail which has to be transported to the place of the shooting, because the cams are difficult to manufacture with an exact profile.

The transmission of the motion through closed-circuit Bowden cables (flexible shafts) lacks also precision and may cause jamming of the system.

The essential disadvantages of this known device are, however, the following (a) there can be shot only a fixed frame of a single size, with variable perspective; (b) it works only when the dolly is traveling in relation to a fixed subject; (c) it does not provide for the realization of other special cinematographic effects.

It is a principle object of the device according to the invention to eliminate the aforedescribed disadvantages. In order to attain this object the device of the present invention includes a system, which utilizes as control elements two rotating cams with spiral shaped profiles. One of the two aforementioned cams controls the focusing of the image clearness and the other one controls the variation of the focal length, both cams being simultaneously rotated by one of the wheels of a traveling dolly, which is movable on a rail. The rotation is transmitted by a gear made up of two or more pinions; the system includes also two separate means for transmitting the motions to a system for the control of the objective, each means being made up of a rack, which in scanning the cam's profile, causes, by means of a pinion, the rotation of a drum on which is wound one end of a Bowden-cable; this rotational motion is transmitted to the actual controls for the lenses of the objective lens system, where the cable is wound and fixed on a drum, which is coupled to the objective by means of a tiltable lever; then the end of the cable is wound and fixed on another drum, which is rotatably biased by a spiral spring, thereby ensuring the tension of the cable and providing the driving force for transmitting a rotation in the opposite sense. The transmission of the motion from the drum of the control system proper to the drum of the system for adjusting the objective may be also realized by other means, such as for example the known electric shaft (selsyn) methods. In order to effect the adjustment of the zoom lens, when the principal subject is moving and the camera remains at rest, the device may be uncoupled from the wheel of the traveling dolly. The motion of the cams can then be effected manually.

Figure 8:
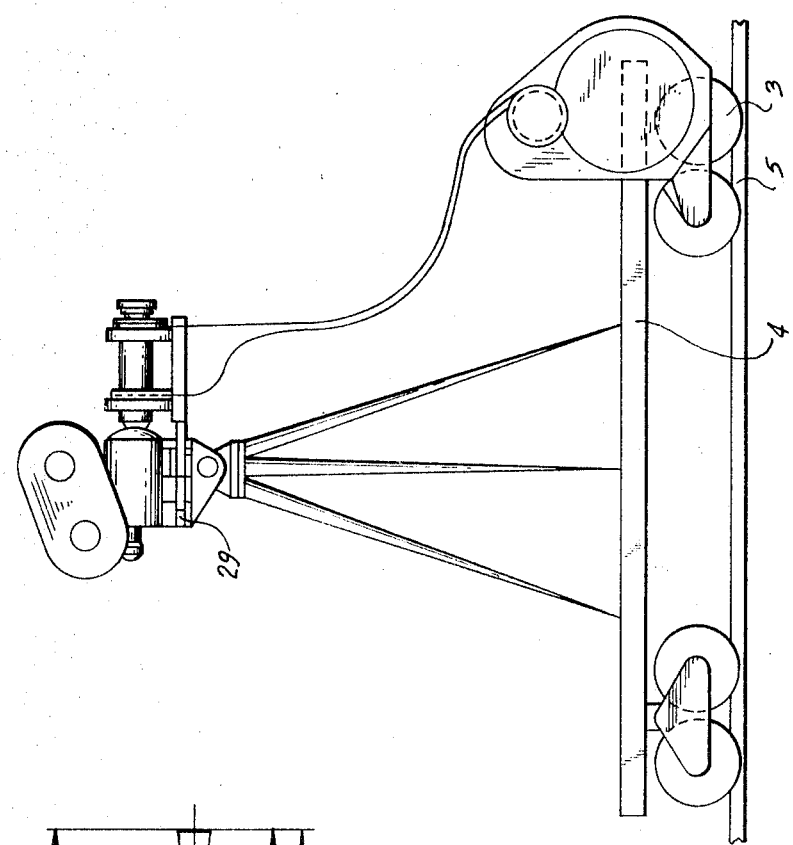
Figure 9:
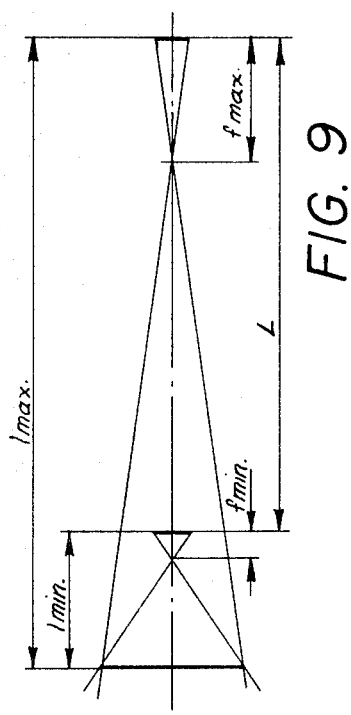

The principles and an embodiment of the invention will become apparent from the following description which will be clearly understood in connection with the accompanying drawings, in which:

FIG. 1: is a diagrammatic elevation of the device of the invention;

FIG. 2: a vertical section through the control system unit of the device of the invention;

FIG. 3: a side elevational view of the control system unit illustrated in FIG. 2;

FIG. 4: a section through the system for automatically uncoupling the cam scanning pin as viewed along line A-B in FIG. 3;

FIG. 5: a side elevational view of the unit for adjusting the objective lens system, in which portions are shown in section for sake of clarity;

FIG. 6: a front elevational view of the unit for adjusting the objective lens system;

FIG. 7: is a detailed sectional view through the drum for adjusting the objective;

FIG. 8: illustrates schematically the device of this invention when connected to a movie camera;

FIG. 9: is diagram of the ranges of the regulations for the control system, and

Figure 10:
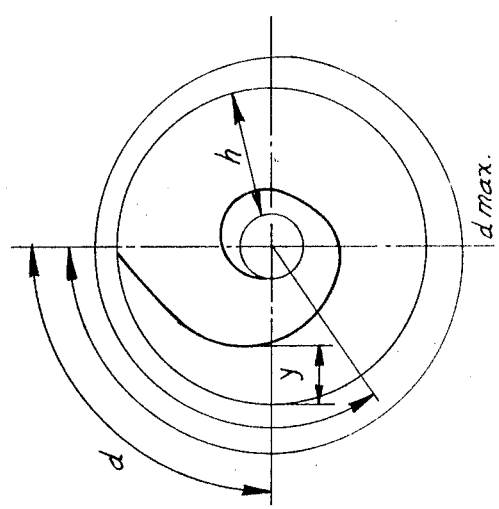

FIG. 10: is a detailed schematic view of a spiral cam of the control system.

Referring now to the drawings the device is made up of a system utilizing as control elements two rotating cams with spiral shaped profiles i.e. a cam 1 for adjusting the focusing of the image clearness of the objective and a cam 2 for varying of the focal length of the objective lens system the two cams are rotated simultaneously by the wheel 3 of a travelling dolly 4, rolling on a rail 5, (see FIG. 8); the rotating motion is transmitted by a gear made up of two or more pinions 6 and 7; alternately the rotating motion can be transmitted by hand, by means of a hand-wheel 8 and a crank 9, driving the cams, through the pinions 10 and 7, if previously the pinion 6 has been uncoupled from the gear arrangement by pulling the pin 11.

For the transmission of the motions from the control system to a system for the adjustment of the objective lens system there are utilized two transmission means, one for focusing the clearness and a second one for the variation of the focal length; each of these transmission means being made up of a rack 12, connected via a pin with roller 13, with a pinion 14, which rotates a drum 15. Around the drum 15 there is wound and fixed the end portion of a flexible shaft (Bowden cable) 16, which transmits the motion to the system for adjusting the objective lens system, where the cable 16 is wound around and fixed on a drum 17, which through a tilting lever 18, pressed by a spring 19 acts on a ring 20. The latter ring is secured on the ring for focusing the clearness of the objective lens system. The end of the cable 16 is then wound up on another drum 21 driven by a spiral spring 22 which ensures the permanent tension of the cable and thus provides the driving force for transmitting the motion in the other sense, in such a way that if cam 1 rotates in the sense of the arrow the driving transmission force is obtained by pushing the traveling dolly or by a manual action, causing simultaneously a tensioning of the spring 22. When the cam is rotated in the sense, inverse to that of the arrow, the driving force is provided by the tension of the spring 22, the rack 12 following exactly the profile "*a*" of the cam. Thus for both senses the motions are transmitted by only one cable, upon which are exerted only forces of tension, which make possible a very precise working of the device. In order to reduce the frictional forces, which may cause vibrations in the transmission system, drum 17 is rotating in roller bearings 23 and drum 21 in roller bearings 24.

It is precisely to use instead of the mechanical system for the transmission of the motion from drum 15 to drum 17 one of the known systems of electric shafts (selsyns), which operate practically free of vibrations. However, if "selsyns" are used, the system becomes much more complex and needs its own sources for supplying the electrical power.

The profiles "*a*" and "*b*" of spiral cams 1 and 2 and the ratios of the motions transmitted from the cams to the objective are separately computed and correlated for each objective, in such a way, that at a variation of the distance between subject and the camera, cam 1 has to realize the focusing of the clearness, while cam 2 has to realize such a variation of the focal length, as to obtain the shooting of a fixed frame with a variable perspective or other special effects desired by the operator.

In order to prevent possible errors the working distance L and the design of the scale for the variation of the focal length, with a view to compensate the frame is done experimentally on a frame test-image according to FIG. 9.

In order to realize variable perspective shootings of fixed frames of various sizes, the pair of spiral cams 1 and 2 are computed and executed separately for each frame size. Thus, for instance by the simple changing of the two cams there may be obtained frame sizes with transforming ratios of the given perspective, indicated with approximation in the following table:

| Size of the frame, m. | Reducing ratio | Focal length, mm. | | Distance object camera, m. | | Displacement of the camera, m. | Ratio of the perspective transformation, $f_{max.}/f_{min.}$ |
|---|---|---|---|---|---|---|---|
| | | $f_{min.}$ | $f_{max.}$ | $l_{min.}$ | $l_{max.}$ | | |
| 0.9×1.50 | 68 | 25 | 250 | 1.70 | 17.0 | 15.3 | 10.00 |
| 1.50×2.50 | 113 | 25 | 160 | 2.82 | 18.1 | 15.3 | 7.25 |
| 2.00×3.32 | 151 | 25 | 126 | 3.8 | 19.1 | 15.3 | 5.1 |
| 3.00×5.00 | 227 | 25 | 92 | 5.7 | 21.0 | 15.3 | 3.7 |

To maintain, for frames of a greater size, the same ratio for the transformation of the perspective, the transmission ratio of pinions 6 and 7 has to be changed too.

At the end if the course, i.e. at $\Phi_{min}$ and $\Phi_{max}$ (FIG. 9) the device of the invention ceases automatically to act on the objective lens system, this being due to the fact, that while cams 1 and 2 rotate in the sense of a displacement of the racks towards the exterior of their diameters, the pins with rollers 13 remain on the great diameter of the cams, while during the rotation in the opposite sense,—the profiles *a* and *b*, having at their end a slope *c*,—(see FIG. 4) the pins will be raised outside the profiles of the cams and they will follow the small diameter of the cams. When the rotation sense of the cams changes, the pins 13 are pressed automatically by some plate springs 24 into the aforementioned profiles and, consequently, begin to act on the objective lens system.

After a change the position of the control cams 1 and 2 is initially recognized by some positional pins 25, these pins being fixed by some special screws 26. The control system constitutes a unit, which is coupled to one or more wheels of the travelling dolly by means of a coupling device having a gliding wedge 27. The control system unit can be fixed to the group of wheels 3 of the dolly by some screws 28.

The system for the adjustment of the objective lens system thus comprises a unit which glides on a support 29 on which is mounted by some corresponding screws camera unit itself.

The zoom lens is fixed by a collar 31, which can be controlled and fixed in relation to the camera by a screw 32, with two nuts.

The system for the control of the Zoom lens can be at every moment coupled to the zoom lens or uncoupled from this lens, by shifting it on the support 29, rotating to this end a button, provided with an eccentric 33, with an angle of 180°.

In FIG. 5 and 7 the control system is represented in a coupled position.

If the entire control system is displaced towards the camera then the tilting levers 18 leave the rings 20 situated on the zoom lens and on the focusing lens, thus permitting that the zoom lens and focusing lens be controlled by hand. If there has to be realized a transition from the manual control to an automatic one, the system is shifted to the left, the levers 18 pass, under the action of the springs 19, on the outer diameter of the rings 20 and when the rings are brought into registry, with the channels *d*, which are disposed near the levers, the control system is automatically coupled with the rings. If during the working, only the system for the focusing of the clearness or only the system of the zoom lens has to be uncoupled from the automatic control, the end of the corresponding lever 18 has only to be pushed, thus permitting that this lever be released from the channel of the driving ring ring 20, which can then be rotated by hand, while the lever continues to glide on the outer diameter of the corresponding ring. 20.

This device, according to the invention for the automatic control of an objective lens system having variable focal length, renders the following advantages:

a. it permits shootings with a fixed frame and variable perspective, when the subject is at rest and the distance between camera and subject is increased or diminished and also if the camera is at rest and the subject is moving. The transition from one size of the frame to another can be effected by a simple change of the control cams;

b. it permits shooting with an automatic control of the image clearness during the motions of the camera—in relation to the subject or vice versa—and it permits also a manual control of the zoom lens;

c. it permits the automatic control of the zoom lens, correlated as a function of the displacement of the travelling dolly and it permits also the manual adjustment of the image clearness, as a function of the displacement of the subject;

d. it permits at every moment of the shooting the transition from automatic control to manual control and vice versa;

e. it permits innumerable combinations for realizing artistic effects, conceived by the fantasy of the movie camera operator;

f. it is simple and easy to be handled.

Although the invention has been illustrated and described with reference to one preferred embodiment thereof, it is to be understood that it is in no way limited to the details of such embodiment but is capable of numerous modifications within the scope of the appended claims.

I claim:

1. Device for controlling and adjusting the focusing means and the means for varying the focal length of a variable focal length objective zoom lens system of a movie camera which is mounted on a dolly having at least one rotatable wheel, comprising in combination, first and second drive trains connected at one end of each to the focusing means and the means for varying the focal length of the zoom lens system, respectively, and at the other end of each to respective cam followers, first and second rotatable cam means cooperating with the respective cam followers, a third drive train extending between and connected to the said wheel of the dolly and the cam means, said third drive train including a selectively disconnectable clutch interposed between the wheel of the dolly and the two cam means, and a fourth, manually driven, drive train connected to the cam means, whereby the cam means for focusing and varying the focal length of the zoom lens may selectively be driven manually, and automatically by movement of the dolly.

2. The device as defined in claim 1, wherein each of the cam means has a spiral cam track therein.

3. The device as defined in claim 2, wherein the spiral cam means and the cam followers cooperating therewith are so constructed and arranged that the cam followers are automatically disengaged at the inner and outer ends of the spiral surfaces, whereby when the clutch is engaged, control of the focusing and variation of the focal length of the zoom lens by the wheel of the dolly ceases when the dolly travels outside a predetermined range of distance from the principal object being photographed.

4. The device as defined in claim 1, comprising disengageable drive means interposed in each of the first and second drive trains adjacent the focusing means and the means for varying the focal length of the zoom lens, whereby the focusing means and the means for varying the focal length of the zoom lens may be manually operated separately.

5. The device as defined in claim 1, including first and second gear racks which meshingly respectively engage first and second gear wheels, on the one hand, and are operatively respectively connected to said first and second spiral cam means, on the other hand; and first and second cable means operatively respectively connecting said first and second gear wheels to said focusing means and said means for varying the focal length.

6. The device as defined in claim 5, wherein said first and second spiral cam means comprise respectively first and second wheel means having a groove of predetermined spiral configuration, said first and second gear racks having rollers mounted thereon which respectively extend into the grooves of said first and second wheel means.

7. The device as defined in claim 5, wherein said rollers are slidably mounted on said first and second gear racks, each roller including biasing means urging it into one of said grooves of spiral configuration, each groove having at each one of its ends an upwardly inclined portion which causes the respective roller to exit from the groove when reaching that portion.

8. The device as defined in claim 5, including first and second biasing means respectively operatively connected to said first and second cable means for keeping them continuously under tension during the operation of the device.

9. The device as defined in claim 5, wherein said focusing means and said means for varying the focal length of an objective lens system are rotatably mounted in said movie camera, a first ring adapted to be connected to said focusing means and a second ring adapted to be connected to said means for varying the focal length, said first and second cable means being respectively wound around said first and second rings, each one of said first and second biasing means including spiral spring means mounted on a respective ring of said first and second rings and being respectively connected to one end of said first and second cable means thereby keeping sand cable means continuously under tension.

10. The device as defined in claim 9, including means operatively connected to said first and second rings, on the one hand, and to said movie camera, on the other hand, for shifting said first and second rings from an operative position, in which they are respectively connected to said focusing means and said means for varying the focal length, to an inactive position, in which they are disconnected therefrom.

11. The device as defined in claim 9, wherein said first and second rings are mounted on a common plate which is slidably movable with respect to said camera, a pin having one eccentric portion rotatable in said camera, said eccentric portion being disposed in an accommodating portion of said common plate so that when said pin is manually turned said common plate shifts position in relation to said camera.

12. The device as defined in claim 11, wherein each one of said first and second rings has a lever pivotally mounted thereon and a spring operatively connected to said lever for respectively urging it into frictional engagement with the means on which the ring is mounted.